(12) United States Patent
Chandra et al.

(10) Patent No.: US 8,559,375 B2
(45) Date of Patent: *Oct. 15, 2013

(54) PEER-TO-PEER WIRELESS COMMUNICATION SYSTEM

(75) Inventors: Arty Chandra, Manhasset Hills, NY (US); Joseph S. Levy, Merrick, NY (US); Sudheer A. Grandhi, Pleasanton, CA (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,950

(22) Filed: Apr. 12, 2012

(65) Prior Publication Data

US 2012/0195263 A1    Aug. 2, 2012

Related U.S. Application Data

(63) Continuation of application No. 11/234,792, filed on Sep. 23, 2005, now Pat. No. 8,159,999.

(60) Provisional application No. 60/646,662, filed on Jan. 25, 2005.

(51) Int. Cl.
    *H04W 4/00*    (2009.01)

(52) U.S. Cl.
    USPC .......................................... 370/328; 370/329

(58) Field of Classification Search
    USPC .................................. 370/328–329
    See application file for complete search history.

(56) References Cited

U.S. PATENT DOCUMENTS

| 7,269,409 | B2 | 9/2007 | Suzuki et al. |
| 2003/0039270 | A1 | 2/2003 | Chang et al. |
| 2003/0204616 | A1 | 10/2003 | Billhartz et al. |
| 2003/0231608 | A1 | 12/2003 | Wentink |
| 2004/0092231 | A1 | 5/2004 | Ayatsuka et al. |
| 2004/0121766 | A1 | 6/2004 | Benson et al. |
| 2004/0156318 | A1 | 8/2004 | Rune et al. |

(Continued)

FOREIGN PATENT DOCUMENTS

| EP | 1 326 386 | 7/2003 |
| EP | 1 331 785 | 7/2003 |

(Continued)

OTHER PUBLICATIONS

Yang, "P-HCCA: A New Scheme for Real-time Traffic with QoS in IEEE 802.11e Based Networks", APAN (Asia Pacific Advanced Network) Network Research Workshop, 2004.

*Primary Examiner* — Steven Lim

(74) *Attorney, Agent, or Firm* — Volpe and Koenig, P.C.

(57) ABSTRACT

A method and apparatus may be used for peer-to-peer communications. A first non-access point (non-AP) station (STA) may receive a message for establishing a direct communication link from a second non-AP STA. The message may include a service priority. The first non-AP STA may transmit another message in response to receiving the message from the second non-AP STA, and communicate directly with the second non-AP STA. The system may be an Ad hoc network comprising a plurality of STAs without an access point (AP) where each STA maintains a database of one-hop and two-hop STAs, and establishes a direct link to other STAs after informing neighboring STAs of an intention to establish a direct communication link.

24 Claims, 2 Drawing Sheets

(56) References Cited

U.S. PATENT DOCUMENTS

| | | |
|---|---|---|
| 2004/0236869 A1 | 11/2004 | Moon |
| 2004/0246934 A1 | 12/2004 | Kim |
| 2005/0003826 A1 | 1/2005 | Khitrik et al. |
| 2005/0058109 A1* | 3/2005 | Ekberg .......................... 370/338 |
| 2005/0083838 A1 | 4/2005 | Kandala |
| 2005/0111419 A1 | 5/2005 | Kwon et al. |
| 2006/0050742 A1 | 3/2006 | Chandra et al. |

FOREIGN PATENT DOCUMENTS

| | | |
|---|---|---|
| KR | 1998-0020178 | 6/1998 |
| WO | 03/039026 | 5/2003 |
| WO | 2004/088453 | 10/2004 |
| WO | 2006/033443 | 3/2006 |

\* cited by examiner

PEER-TO-PEER WIRELESS COMMUNICATION SYSTEM

CROSS REFERENCE TO RELATED APPLICATION

This application is a continuation of U.S. patent application Ser. No. 11/234,792 filed Sep. 23, 2005, which issued on Apr. 17, 2012 as U.S. Pat. No. 8,159,999, which claims the benefit of U.S. Provisional Application No. 60/646,662 filed Jan. 25, 2005, which is hereby incorporated by reference.

FIELD OF INVENTION

The present invention is related to a wireless communication system including a plurality of wireless stations (STAs) and an access point (AP), (i.e., a centralized controller), and a wireless communication system including a plurality of STAs without a centralized controller, (i.e., an Ad hoc network). More particularly, the present invention is related to a method and system for establishing data transfers between the STAs using a direct link setup (DLS).

BACKGROUND

Typically, STAs are not allowed to transmit data packets directly to other STAs in a Basic Service Set (BSS) and, instead, must always rely on the AP for the delivery of the data packets. However, STAs with a quality of service (QoS) facility, (i.e., QSTAs), may transmit data packets directly to another QSTA by establishing a data transfer using a DLS. The IEEE 802.11e standard is associated with the support of QoS features such as service differentiation, block acknowledgement (ACK) and DLS. The STAs that support these IEEE 802.11e features are referred as QSTAs. Similarly, an AP that supports these IEEE 802.11e features is referred to as a QAP. The need for the DLS is motivated by the fact that the intended recipient STA may be in a power save mode, whereby the recipient QSTA may only be activated, (i.e., awakened), by an AP with a QoS facility, (i.e., QAP). The DLS exchanges a rate set and other information between a transmitter in one QSTA and a receiver in another QSTA. DLS messages may be used to attach security information elements (IEs).

SUMMARY

The present invention is related to a peer-to-peer communication system using a DLS. A mobile station (STA) establishes a direct communication link with another STA by sending a message requesting a DLS to an access point (AP), (i.e., a centralized controller). The AP may accept or reject the DLS request based on channel measurements. If the DLS request is accepted, the DLS is established such that the STAs may directly communicate with each other. An established DLS connection may be torn down by the AP sending a message including a DLS teardown request to one of the STAs, or based on channel measurements. The system may be an Ad hoc network comprising a plurality of STAs without an AP where each STA maintains a database of one-hop and two-hop STAs, and establishes a direct link to other STAs after informing neighboring STAs of an intention to establish a direct communication link.

A first non-AP STA may receive a message for establishing a direct communication link from a second non-AP STA. The message may include a service priority. The first non-AP STA may transmit another message in response to receiving the message from the second non-AP STA, and communicate directly with the second non-AP STA.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "STA" or "QSTA" includes but is not limited to a wireless transmit/receive unit (WTRU), a user equipment, a mobile station, a fixed or mobile subscriber unit, a pager, or any other type of device capable of operating in a wireless environment. When referred to hereafter, the terminology "AP" or "QAP" includes but is not limited to a base station, a Node-B, a site controller, a centralized controller or any other type of interfacing device in a wireless environment.

The features of the present invention may be incorporated into an integrated circuit (IC) or be configured in a circuit comprising a multitude of interconnecting components.

The present invention facilitates the establishment of data transfers between QSTAs of a peer-to-peer wireless communication system, such as a wireless local area network (WLAN) or a wireless wide area network (WWAN), using a DLS. The present invention further performs a signaling procedure for establishing the DLS, tearing down the DLS, and performing a data transfer with hybrid coordination function controlled channel access (HCCA) or enhanced distributed channel access (EDCA).

Additional details regarding DLS, HCCA and EDCA are disclosed in copending U.S. patent application Ser. No. 11/199,446 entitled "Method and System for Controlling Access to a Wireless Communication Medium" by Sudheer A. Grandhi et al., which is incorporated by reference as if fully set forth.

Figure 1:
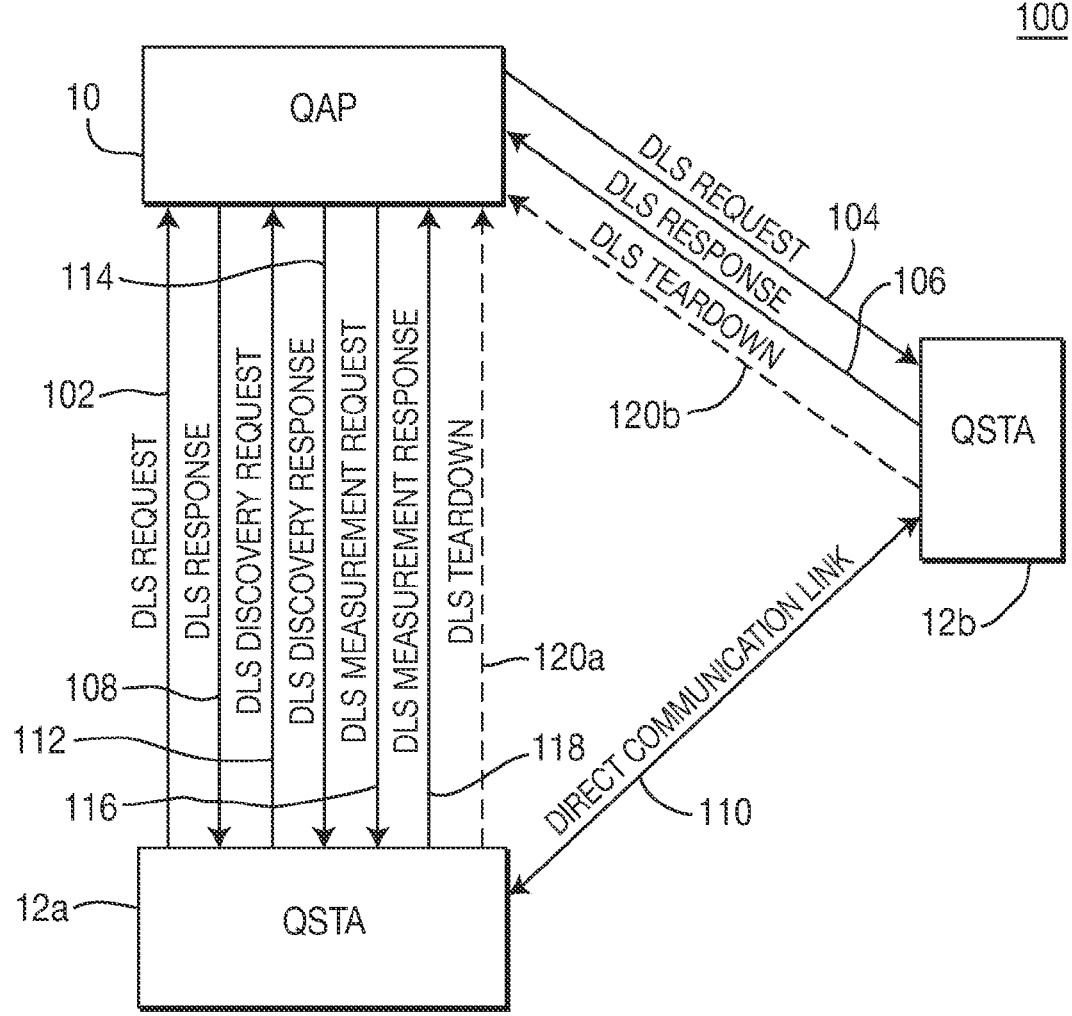
FIG. 1 is an exemplary block diagram of a wireless communication system including a plurality of QSTAs and a QAP in accordance with the present invention.

FIG. 1 is an exemplary block diagram of a wireless communication system 100 including a plurality of QSTAs 12a, 12b and a QAP 10. Similar to conventional wireless communication systems, the QSTA 12a intends to exchange data packets directly with the QSTA 12b. The QSTA 12a invokes a DLS by including a DLS request frame in a message 102 sent to the QAP 10 by the QSTA 12a. The message 102 may include a rate set, capability information of the QSTA 12a, the medium access control (MAC) addresses of the QSTAs 12a and 12b, or other necessary information. If the QSTA 12b is associated with the QAP 10 in a basic service set (BSS) that has a policy which allows direct data transfers to take place between QSTAs, the QAP 10 forwards the DLS request frame in a message 104 to the QSTA 12b. If the QSTA 12b accepts the DLS request frame, the QSTA 12b includes a DLS response frame in a message 106 sent to the QAP 10 by the QSTA 12b which contains a rate set. The QAP 10 includes the DLS response frame in a message 108 sent to the QSTA 12a.

Thereafter, a direct communication link 110 is established between the QSTA 12a and the QSTA 12b.

In accordance with the present invention, the QAP 10 may reject the DLS request received from the QSTA 12a due to inadequate channel quality of signals associated with the QSTAs 12a, 12b, and thus the QAP 10 will not send the message 104 to the QSTA 12b. The DLS request frame included in the message 102 includes an IE for optimal physical layer (PHY) rate and/or other channel quality information between the QSTAs 12a and 12b. This information may be obtained from previous transmissions between the QSTA 12a and the QSTA 12b, or by listening to the transmissions from the QSTA 12b, (received by the QAP 10 or other QSTAs). If the information is not available, the QSTA 12a sends the message 102 with the IE set to 0, (i.e., null).

If the QSTA 12a needs to perform a search for the QSTA 12b, the QSTA 12a may include a DLS discovery request frame in a message 112 sent to the QAP 10. If the QAP 10 is aware of the QSTA 12b, the QAP 10 includes a DLS discovery response frame with relevant MAC information in a message 114 sent to the QSTA 12a. Otherwise, the QAP 10 includes the DLS discovery response frame and an indication that the QSTA 12b could not be located in the message 114. This procedure is performed before the DLS is established.

Referring to FIG. 1, additional messages may be further exchanged before or after the DLS is established. The QAP 10 may optionally include a DLS measurement request packet in a message 116 sent to the QSTA 12a to request a channel quality measurement. The message 116 may also include information regarding the capability of QSTA 12b to perform a channel quality measurement. The capability information includes, but is not limited to, a number of antennas, and an indication of the type of antenna technology supported such as multiple-input multiple-output (MIMO), antenna diversity or any other smart antenna technology. The QSTA 12a responds to the message 116 by including a measurement response packet in a message 118 sent to the QAP 10. The message 118 may also include the channel quality measurement results between the QSTA 12a and the QSTA 12b. Channel measurements may include received signal strength indication (RSSI) between QSTA12a to QSTA12b, channel quality indicator (CQI) between QSTA 12a and QSTA 12b and interference level at QSTA 12a. RSSI is measured at QSTA 12a from QSTA 12b by passively listening to packets sent from the QSTA 12b to the QAP 10 or other QSTAs/STAs. CQI measurements may be obtained by actively transmitting packets from QSTA 12a to QSTA 12b even before the DLS is implemented. The messages 116 and 118 may be exchanged before message 108 is sent by the QAP 10 or during an ongoing DLS session.

In conventional wireless communication systems, the DLS may be torn down by either one of the two QSTAs 12a, 12b. The DLS teardown process cannot be initiated by the QAP 10. The QSTAs 12a, 12b can teardown the DLS due to inactivity or completion of an application. Each QSTA 12a, 12b may include a timer which is reset each time a packet is received, (a data packet or an acknowledgement (ACK) packet), from the other QSTA 12a, 12b. The timer is used to end the DLS due to a link failure or completion of an application. If no packets are received before the timer expires, or an application is completed, the QSTA 12a, 12b initiates a DLS teardown process by including a DLS teardown packet in a message 120a, 120b sent to the QAP 10. After the DLS teardown process is completed, all packets sent by the QSTAs 12a, 12b are processed by the QAP 10.

Either of the QSTAs 12a, 12b may send the DLS teardown packet to the QAP 10. Once the DLS teardown message 120 is sent by one of the QSTAs 12a, 12b, the QAP 10 will forward the DLS teardown message to the other one of the QSTAs 12a, 12b. The DLS teardown process may be implemented in any access method, (e.g., an assigned resource allocation, a management resource allocation, HCCA or EDCF).

In accordance with the present invention, the QAP 10 may initiate a DLS teardown by sending a DLS response message 108 including a DLS teardown action field to either of the QSTAs 12a or 12b. The action frame includes a timer information field whereby the QSTA 12a or 12b must respond by sending a DLS teardown message to the QAP 10 before the timer expires. This feature is backward compatible with current WLAN standards.

The QAP 10 may initiate a DLS between two QSTAs 12a and 12b. The QAP 10 sends a DLS initiate message to each of the QSTAs 12a and 12b. Once the QAP 10 receives a DLS request message from both of the QSTAs 12a and 12b in the response of the DLS initiate message, the QAP 10 may send a DLS response message to both of the QSTAs 12a and 12b. The DLS initiate message is a new message introduced by the present invention to allow the QAP 10 to initiate a DLS between two STAs. Alternatively, the DLS request message and the DLS response message may be modified to initiate a DLS from the QAP 10 instead of creating a new DLS initiate message.

Data transfer after the DLS is established is explained hereinafter. The QSTAs may use the DLS for performing data transfers using any of the access mechanisms defined in IEEE 802.11e standards, such as an HCCA or an EDCF.

The present invention provides several action frame formats for DLS management purposes. An action field, immediately after the category field, differentiates the formats. The action field values associated with each frame format are defined in Table 1.

TABLE 1

| Action Field Value | Meaning |
| --- | --- |
| 0 | DLS request |
| 1 | DLS response |
| 2 | DLS teardown |
| 3-255 | Reserved |

Additional action field values are defined in accordance with the present invention. A DLS discovery request frame is for a QSTA to get a MAC address of another QSTA by sending application requirements. A DLS discovery response frame is for a QAP to respond back with the MAC address of the requested QSTA. A conventional DLS teardown frame is modified to add an action field for DLS teardown by the QAP. An information field called a timer is included in the DLS teardown frame. The QAP expects that a QSTA would send the DLS teardown message to the QAP before the timer expires. A conventional DLS request frame is modified to include an additional element to send optimal PHY data rate and certain other channel characteristic between the two QSTAs. A DLS measurement request frame is for measurement request from a QAP to a QSTA. The DLS measurement request frame contains capability information of another QSTA. A DLS measurement response frame is for DLS measurement response from a QSTA to a QAP. The DLS measurement response frame contains measurement information and another QSTA MAC address.

Figure 2:
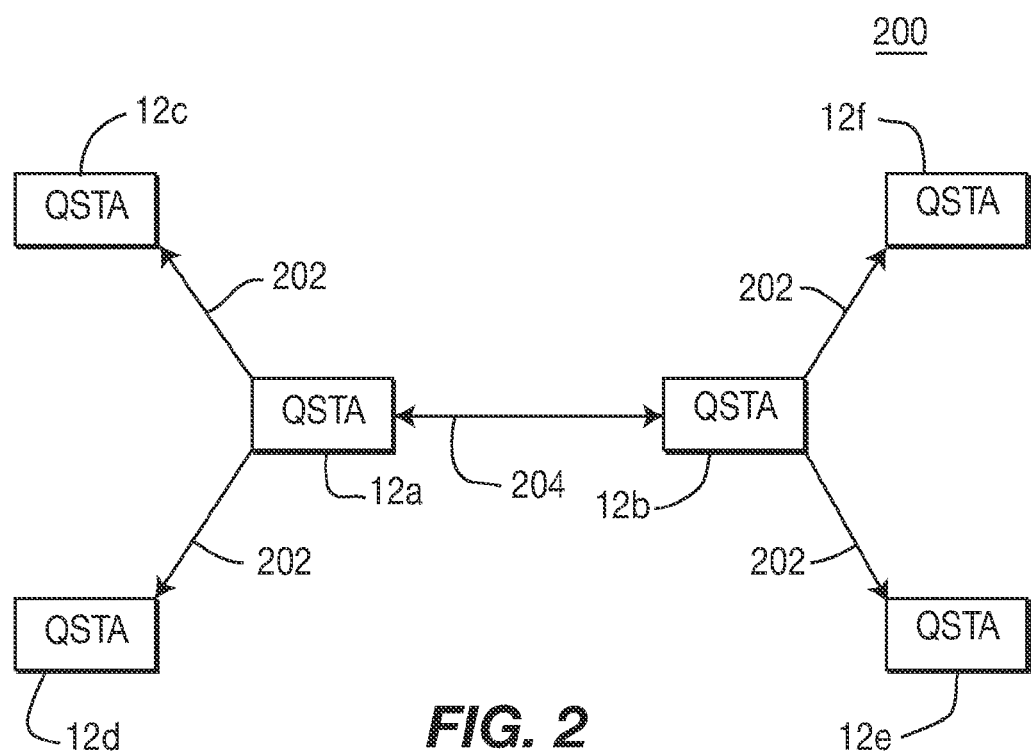
FIG. 2 is a block diagram of an Ad hoc network comprising a plurality of STAs for supporting peer-to-peer communication in accordance with the present invention.

FIG. 2 is a block diagram of an Ad hoc network 200 comprising a plurality of QSTAs 12a, 12b, 12c, 12d, 12e, 12f for supporting peer-to-peer communication in accordance with another embodiment of the present invention. Each of the QSTAs 12a-12f maintains a database (not shown) of all of the QSTAs 12a-12f within one hop and two hops. One hop QSTAs are QSTAs that can hear each other and are referred to hereinafter as "neighbors". Two hop QSTAs are QSTAs that cannot be heard directly, but a neighbor can hear.

There are two groups of QSTAs that need to be informed when the media will be in use, the QSTAs that can hear the transmission and the QSTAs that could possibly transmit and interfere with the reception. Therefore, only a transmitting QSTA and a receiving QSTA need to inform their neighbor QSTAs, respectively. The transmitting QSTA needs to tell its neighbors that the medium is in use and the neighbors cannot receive without interference. The receiving QSTA needs to tell its neighbors that the medium is in use and that the neighbors should not transmit. This may require some handshaking to be properly implemented, but it will yield better overall medium efficiency.

Neighboring QSTAs send signals between each other to report capabilities via capability messages. The capability messages may be transmitted as a part of an initialization process when a QSTA is powered on. The capability messages may be periodic or event-triggered by some activity or inactivity of any QSTA, or can also be a reply to an information request signal initiated by one of the QSTAs.

A new QSTA may send a broadcast message to neighbors asking for active transmission. The new QSTA may passively scan the channels and then send directed packets. Upon reception of the request, any QSTA in active secession may send the information back to the new QSTA. The QSTAs follow a random back off before responding. Once the new QSTA gets the information, the new QSTA uses this information to optimally allocate resources for starting a new application.

For example, in the Ad hoc network 200 of FIG. 2, the QSTA 12a and the QSTA 12b intend to communicate with each other. Before running an application between QSTA 12a and QSTA 12b, one or both of the QSTA 12a and QSTA 12b inform neighbors by sending messages 202 about the application. The message 202 may be sent as a broadcast and/or propagated to the two hop QSTAs. Alternatively, the message 202 may include a packet directed to specific QSTAs. After informing neighboring QSTAs of the intended communication, the QSTA 12a and the QSTA 12b may communicate by exchanging messages 204 without interference.

Information that is communicated between the QSTAs 12a, 12b may include, but is not limited to, bandwidth requirement, identification of the transmitting QSTA and the receiving QSTA, a frequency band, a preferred modulation mode, sub-carriers, a MIMO enabled code, or the like. This information should preferably be communicated during the establishment of DLS. However, it may be communicated during the DLS communication to update certain parameters such as preferred modulation. This information may be resent in response to a request from another QSTA. The QSTAs can ask for this information to update their statistics or to start a new application.

Some services or applications may have priority over others, whereby they may disrupt other services if required. An example of this service is voice-over-IP (VoIP) for emergency (911) calls. The disruption can be performed by a message exchange between other transmitting QSTAs to stop their service, or by a message exchange to re-negotiate a bandwidth, a sub-carrier, a frequency band, or the like.

Figure 3:
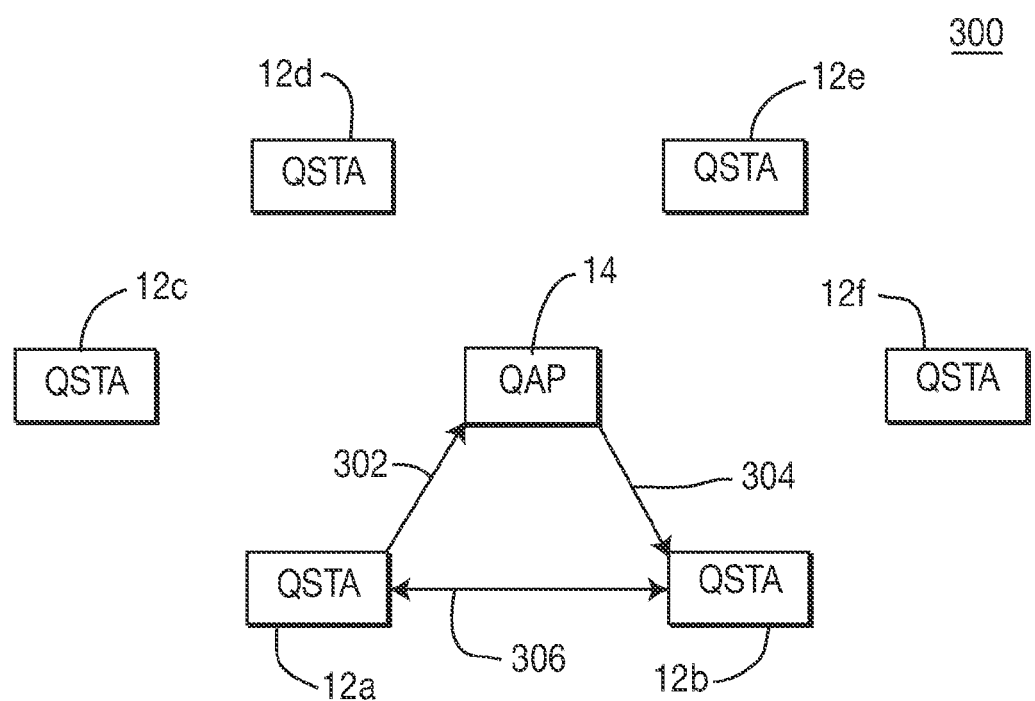
FIG. 3 is a block diagram of a network comprising a plurality of STAs and an AP for supporting peer-to-peer communication in accordance with the present invention.

FIG. 3 is a block diagram of a network 300 including a plurality of QSTAs 12a-12f and a QAP 14 in accordance with the present invention. Similar to the Ad hoc network 200 of FIG. 2, each of the QSTAs 12a-12f maintains a database of all QSTAs with which each QSTA 12a-12f can directly communicate and with which each QSTA 12a-12f can communicate through the QAP 14. The QAP 14 may provide the database of QSTAs available through the QAP 14.

Each of the QSTAs 12a-12f is connected to the QAP 14. However, all traffic does not necessarily originate from or pass through the QAP 14. Thus, two QSTAs may communicate with each other directly without sending the traffic through the QAP 14. This process may be controlled by the QAP 14 and a distributed control which is similar to the non-AP case described above with reference to FIG. 2.

In the process controlled by the QAP 14, for example, a QSTA 12a intends to communicate with a QSTA 12b. The QSTA 12a sends a message 302 to the QAP 14 which includes at least one of a destination ID, a required bandwidth, channel information, a direct hop to the destination, or the like. Based on the information provided in message 302, the QAP 14 determines whether to let the two QSTAs 12a, 12b directly communicate, or communicate through the QAP 14. The QAP 14 may make this determination based on the signal strength between the two QSTAs 12a, 12b, current network load, activity of the QAP 14, capability of the two QSTAs 12a, 12b, or the like. The QAP 14 sends a message 304 including allocation information for assigning resources, (e.g., a certain time, sub-carriers or antennas), for the connection based on the requirements and indicate what is available. A direct communication link is then established 306 between the QSTAs 12a and 12b.

The allocation information in the message 304 is sent to the QSTA 12a and QSTA 12b. The other QSTAs 12c-12f may also be informed of the direct communication link 306 so that they are aware of the resource being in use. The QSTAs 12c-12f can be informed by broadcasting the message 304 to all of the QSTAs 12a-12f or by requiring all QSTAs 12a-12f to monitor the QAP 14 for the message 304, even if it is not intended for their use. This may prevent other QSTAs 12a-12f from using the same resources.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of establishing a direct communication session, the method comprising:
   receiving, by a first non-access point (non-AP) station (STA), an initiation message from a second non-AP STA for establishing a direct communication link with the second non-AP STA, wherein the initiation message includes application information that includes a service priority, wherein the service priority indicates an application that may interrupt an ongoing application;
   transmitting a response message; and
   communicating directly with the second non-AP STA.

2. The method of claim 1, wherein the initiation message includes capability information of the second non-AP STA.

3. The method of claim 1, wherein the initiation message includes discovery information.

4. The method of claim 1, wherein the response message includes capability information of the first non-AP STA.

5. The method of claim 1, wherein the response message includes application information.

6. The method of claim 5, wherein the application information in the response message includes a service priority, wherein the service priority indicates an application that may interrupt an ongoing application.

7. The method of claim 1, wherein the response message includes discovery information.

8. The method of claim 1, wherein the initiation message includes a bandwidth requirement of the second non-AP STA and the response message includes a bandwidth requirement of the first non-AP STA.

9. The method of claim 1, wherein the initiation message includes an identification of the second non-AP STA and the response message includes an identification of the first non-AP STA.

10. The method of claim 1, wherein the initiation message includes a modulation mode of the second non-AP STA and the response message includes a modulation mode of the first non-AP STA.

11. The method of claim 1, wherein the initiation message includes a preferred subcarrier of the second non-AP STA and the response message includes a preferred subcarrier of the first non-AP STA.

12. The method of claim 1, wherein the initiation message includes a first multiple input multiple output (MIMO) enabled code and the response message includes a second MIMO enabled code.

13. A non-access point (non-AP) station (STA) configured to establish a direct communication session, the non-AP STA comprising:
    a receiver configured to receive an initiation message from a remote non-AP STA to establish a direct communication link with the remote non-AP STA, wherein the initiation message includes application information that includes a service priority, wherein the service priority indicates an application that may interrupt an ongoing application; and
    a transmitter configured to transmit a response message, wherein the transmitter and the receiver are further configured to communicate directly with the remote non-AP STA.

14. The non-AP STA of claim 13, wherein the receiver is configured to receive an initiation message that includes capability information of the remote non-AP STA.

15. The non-AP STA of claim 13, wherein the receiver is further configured to receive an initiation message that includes discovery information.

16. The non-AP STA of claim 13, wherein the transmitter is further configured to transmit a response message that includes capability information of the non-AP STA.

17. The non-AP STA of claim 13, wherein the transmitter is further configured to transmit a response message that includes application information.

18. The non-AP STA of claim 17, wherein the transmitter is further configured to transmit application information that includes a service priority, wherein the service priority indicates an application that may interrupt an ongoing application.

19. The non-AP STA of claim 13, wherein the transmitter is further configured to transmit a response message that includes discovery information.

20. The non-AP STA of claim 13, wherein the receiver is further configured to receive an initiation message that includes a bandwidth requirement of the remote non-AP STA and the transmitter is further configured to transmit a response message that includes a bandwidth requirement of the non-AP STA.

21. The non-AP STA of claim 13, wherein the receiver is further configured to receive an initiation message that includes an identification of the remote non-AP STA and the transmitter is further configured to transmit a response message that includes an identification of the non-AP STA.

22. The non-AP STA of claim 13, wherein the receiver is further configured to receive an initiation message that includes a modulation mode of the remote non-AP STA and the transmitter is further configured to transmit a response message that includes a modulation mode of the non-AP STA.

23. The non-AP STA of claim 13, wherein the receiver is further configured to receive an initiation message that includes a preferred subcarrier of the remote non-AP STA and the transmitter is further configured to transmit a response message that includes a preferred subcarrier of the non-AP STA.

24. The non-AP STA of claim 13, wherein the receiver is further configured to receive an initiation message that includes a first multiple input multiple output (MIMO) enabled code and the transmitter is configured to transmit a response message that includes a second MIMO enabled code.

* * * * *